United States Patent [19]
Bright

[11] Patent Number: 5,241,597
[45] Date of Patent: Aug. 31, 1993

[54] METHOD FOR RECOVERING FROM ENCRYPTION KEY VARIABLE LOSS

[75] Inventor: Michael W. Bright, Arlington Heights, Ill.

[73] Assignee: Motorola, Inc., Schaumburg, Ill.

[21] Appl. No.: 649,102

[22] Filed: Feb. 1, 1991

[51] Int. Cl.⁵ .......................... H04L 9/02; H04K 1/00
[52] U.S. Cl. ........................................ 380/21; 380/30; 380/43; 380/44; 380/45; 380/47
[58] Field of Search .................... 380/43, 44, 45, 47, 380/21, 30

[56] References Cited

U.S. PATENT DOCUMENTS

| 4,157,454 | 6/1979 | Becker | 380/45 |
| 4,238,854 | 12/1980 | Ehrsam et al. | |
| 4,926,475 | 5/1990 | Spiotta et al. | 380/44 |

Primary Examiner—Stephen C. Buczinski
Attorney, Agent, or Firm—John W. Hayes

[57] ABSTRACT

A method for recovering from encryption key variable loss, either inadvertent or the result of tampering. A predetermined key encryption key is encrypted with itself at the time when keys are first loaded, and the resultant key loss key is stored in non-volatile memory. This key loss key acts as a key encryption key for decryption of new shadow and traffic keys.

4 Claims, 3 Drawing Sheets

METHOD FOR RECOVERING FROM ENCRYPTION KEY VARIABLE LOSS

FIELD OF THE INVENTION

This invention relates generally to communication equipment such as, but not limited to, RF (radio frequency) communication equipment using encryption to achieve enhanced communication security, and is more particularly directed toward a method for recovering from accidental loss of encryption key variables.

BACKGROUND OF THE INVENTION

As RF communication technology has advanced, sophisticated scanning receivers have become available that make eavesdropping on the communications of others a relatively simple matter. This proliferation of scanners is of particular concern to law enforcement agencies, who have sometimes found their efforts thwarted by the advance warning provided to perpetrators through unauthorized monitoring of tactical communications.

Of course, police agencies are not the only organizations who may wish to keep their communications secret. Various government and business groups also benefit from ensuring that information exchangers are safe from unauthorized listeners.

A method well-known in the art for providing secure communication is digital encryption of information signals. In a digital encryption system, analog information signals are digitized and applied to the input of a digital encryption device. This digitized input is known as "plain text" in the art. Of course, digital information signals do not require this digitizing step, but must sometimes be subjected to additional processing for the sake of compatibility.

In the encryption device, the plain text input is added modulo 2 to a "key stream". The key stream is a seemingly random digital bit stream that is generated by the encryption device from a unique "key". The key is a special code that is loaded into the encryption device of a particular communication unit or units. Other communication units equipped with the same key will be able to decrypt the encrypted information signals, but to communication units that do not have the right key, encrypted signals will sound like noise. Keys used for encryption and decryption of information signals are often termed "traffic keys."

Cryptanalysts are listeners who are equipped with sophisticated devices designed to circumvent system security. If even a part of a traffic key becomes known to a skilled cryptanalyst, it is possible that the secure nature of communication within the system may be compromised. For this reason, it is sometimes necessary to "re-key" the communication units with new traffic keys. Of course, re-keying may also be desirable for other reasons. To maximize system security, it is considered good operating practice to re-key communication units on a regular basis; weekly, for example. Or, a particular user or group of users may wish to communicate with another group whose traffic keys were not originally provided.

To facilitate the re-keying process, new keys may be transmitted to selected units via RF signals. This operation is known as over-the-air re-keying. Over-the-air re-keying, while a convenient capability, is made more complex by the need to keep traffic keys out of the hands of cryptanalysts. It would be inappropriate, for example, to transmit key variables over the air in an unencrypted form, or "in the clear" as it is called. To ensure that new key variables can be transmitted to users without detection, a set of special encryption keys, called shadow keys or key encryption keys, is used.

Since the threat of tampering is always present in a high-security system, key variables are generally stored in non-volatile memory devices. This is to facilitate zeroing or clearing of key variable memory in the event that tampering is detected. This clearing of the memory obviates the threat of an adversary reading the key variables from the memory device and thus compromising system security. Even in the absence of a direct tampering indication, key variables are erased if power to a communication unit's internal circuitry is interrupted for more than a predetermined period.

If key variables, including both traffic keys and shadow keys, are inadvertently erased, the successful transmission of new traffic keys in an over-the-air re-keying process is rendered impossible. Accordingly, a need arises for a method for re-keying a communication unit over the air even after inadvertent loss of encryption key variables.

SUMMARY OF THE INVENTION

The above-described need is satisfied through the method of the present invention, which comprises deriving a new key encryption key from a previously stored key and storing the result in non-volatile memory as a key loss key, decrypting a transmitted key using the new key encryption key, and storing the decrypted key for use in decrypting additional keys and/or information signals.

DESCRIPTION OF A PREFERRED EMBODIMENT

Figure 1:
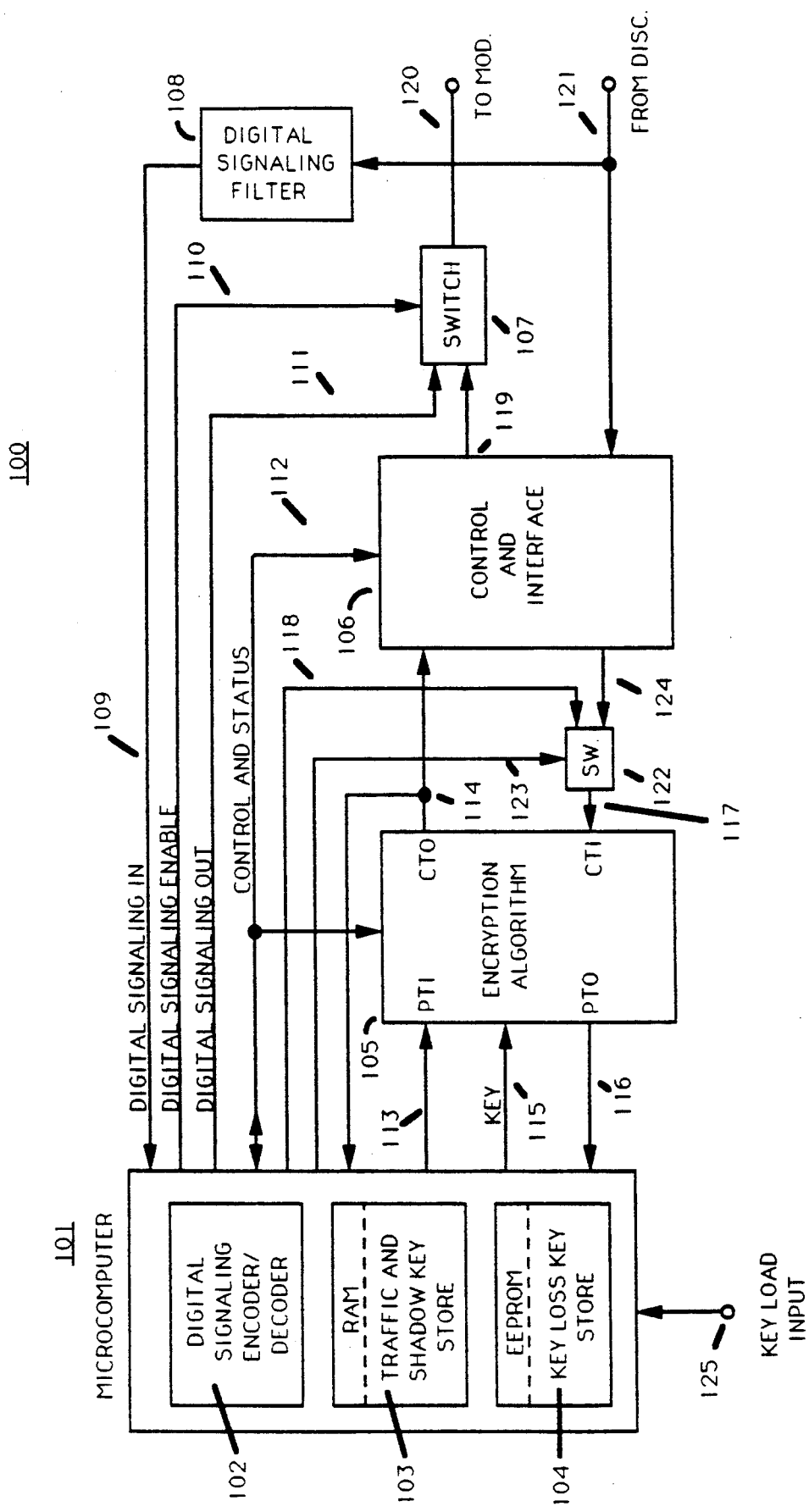
FIG. 1 is a block diagram of an encryption/decryption subsystem implementing the method of the present invention.

FIG. 1 illustrates, by way of a block diagram, an encryption/decryption subsystem as generally depicted by the number 100. The encryption/decryption subsystem incorporates a microcomputer (101) which, in the preferred embodiment, is a 68HC11 microcomputer manufactured by Motorola, Inc. The microcomputer (101) includes a digital signaling encoder/decoder (102), Random Access Memory (RAM) (103), and Electrically Erasable/Programmable Read Only Memory (EEPROM) (104), all of which will be discussed in more detail below.

An encryption algorithm (105) provides the capability to encrypt and decrypt information signals. Preferably, the encryption algorithm (105) is implemented as a custom integrated circuit (IC). A control and interface module (106), also preferably implemented as an IC, performs clock recovery, data detection, and control functions, while providing status information to the microcomputer (101). The control and interface module is provided with a signal input (121) that generally originates at the receiver, and specifically the discriminator, of an FM (frequency modulation) communication unit. A data output (119) is also provided that forms one of the inputs of a switch (107), whose output is coupled via an interconnecting lead (120) to the modulator input of the transmitter section of an FM communication unit. The switch (107) is discussed in more detail in subsequent paragraphs.

The RAM section (103) of the microcomputer (101) is used to store traffic keys needed by the encryption algorithm (105) in the encryption and decryption of information signals. So-called shadow keys (or key encryption keys) are also stored in the RAM area (103). The shadow keys are used to encrypt new traffic keys for transmission to a communication unit in the event that new keys are required for a specific application. A key transfer path (115) is provided so that the microcomputer (101) can load new keys from the RAM (103) into the encryption module (105).

As stated previously, the encryption module (105) provides capability for both encryption and decryption of digital signals. An unencrypted data stream, or plain text, may be provided by the microprocessor (101) over an input line (113) to the plain text input (PTI) of the encryption algorithm (105). Although not shown in the figure for the sake of clarity, the PTI input to the encryption algorithm may be multiplexed with other devices. Internal to the encryption algorithm (105), as is well-known in the encryption art, a digital data stream called the key stream, that has noise-like properties, is produced using a known key. This key stream is added, modulo-2, to the input plain text in order to produce a cipher text output (CTO). This cipher text, which is the encrypted signal, is provided to the microcomputer (101) through an interconnecting data path (114). As indicated in FIG. 1, the control and interface device (106) may also monitor the cipher text output of the encryption algorithm. After additional processing has been performed, the output signal is provided to the modulator input via signal path 120 through the switch (107).

The decryption process is essentially the opposite of encryption. A cipher text input stream is provided over a data path (118) leading from the microcomputer (101) to the encryption algorithm's cipher text input (CTI). As shown in FIG. 1, a signal from the discriminator may be received on signal line 121 and provided to the control and interface device (106), where the digital signal is recovered and passed to the encryption algorithm by first being applied to a switch (122) via an appropriate signal path (124). The switch (122), which will be discussed in more detail below, allows the microcomputer (101) to control the source of the digital input signal being applied to the encryption algorithm (105). A key stream produced from the same key used to encrypt the received cipher text is added, modulo-2, to the input cipher text. Since modulo-2 subtraction is the same as modulo-2 addition, a decrypted signal, or plain text, results. This decrypted signal is coupled via an interconnecting path (116) from the plain text output (PTO) of the encryption algorithm (106) to the microcomputer (101). Again, although not shown in the figure for the sake of clarity, the PTO of the encryption device may be monitored by other devices.

To initialize the communication unit for the first time, an unencrypted shadow key must first be entered into the microcomputer (101) and stored in RAM. This is typically done through a direct connection (125) between a keyloading device and the microcomputer so as not to compromise the security of the system by transmitting an unencrypted shadow key over the normal communication channel.

Figure 3:
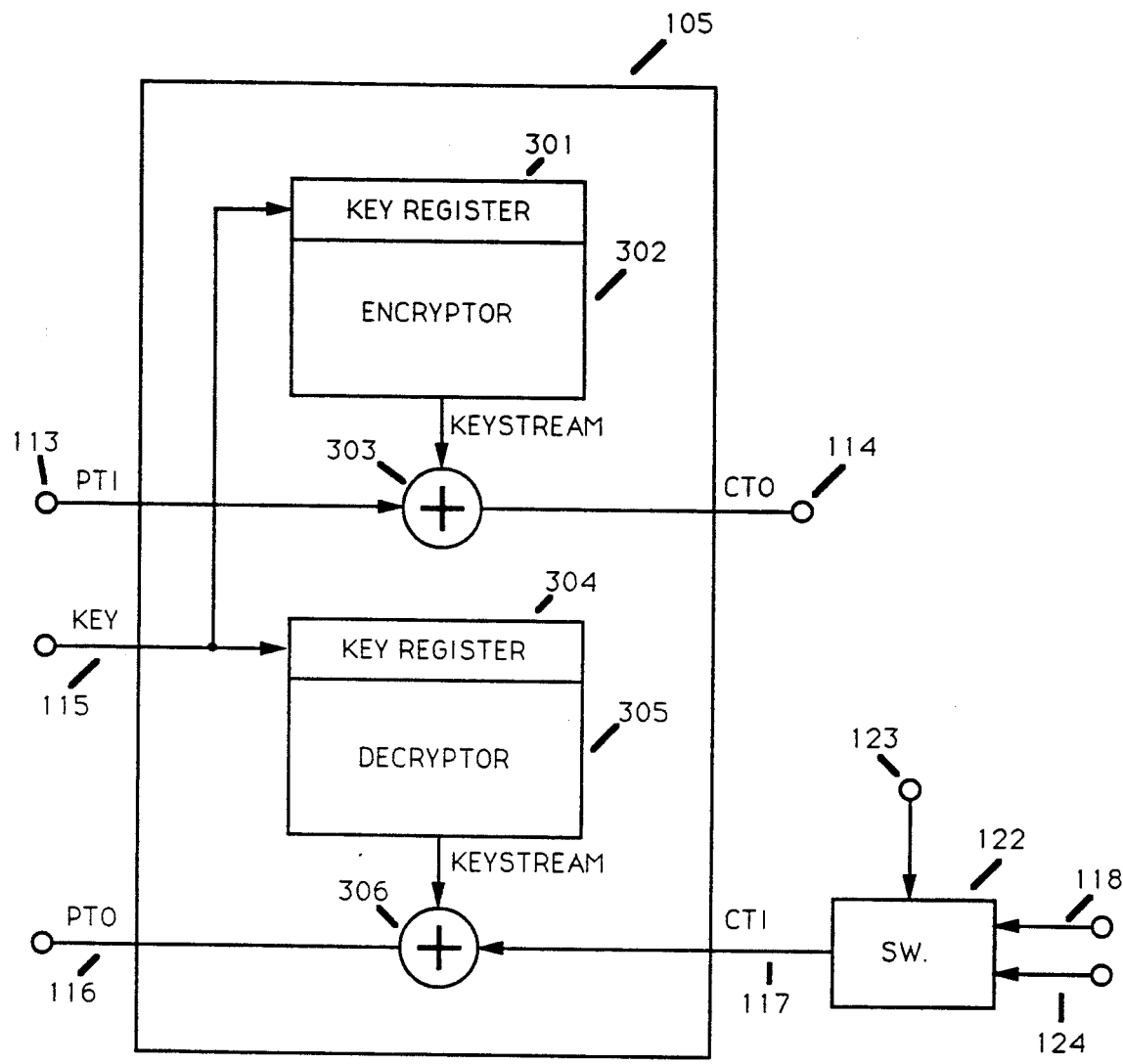
FIG. 3 is a more detailed view, in block diagram form, of the encryption module shown in FIG. 1.

Once the first shadow key is received, the microprocessor (101) uses the encryption module (105) to generate the key loss key. In the preferred embodiment, the key loss key is generated by encrypting the shadow key with itself. FIG. 3 is helpful in explaining the encryption process. The key variable being used to generate the key loss key is transferred across the key line (115) to the encryption module (105). Thus, the shadow key is loaded into the working key registers (301 and 304) of both the encryptor (302) and decryptor (305), although only the encryptor (302) is involved in key loss key generation. The same shadow key is placed on the PTI line (113) of the encryption module (105) where it is added modulo 2 (303) to the keystream from the encryptor (302). Since the shadow key is used as both the working key for the encryptor (302) and the plain text input, the shadow key can be said to have been encrypted with itself. The encrypted result taken from the CTO line (114) is stored in the EEPROM section (104) of the microcomputer (101) as the key loss key. The encrypted result is then used as a "plain text" key.

In communicating new key variables to a communication unit, a special digital signaling scheme is employed. Of course, many digital signaling schemes known in the art would prove perfectly satisfactory for this process, but, in the preferred embodiment, a signaling scheme called MDC, developed by Motorola, Inc., is used. When the re-keying process is initiated, digital signaling is received by the communication unit being re-keyed, and is routed through a digital signaling filter (108) to the microcomputer (101) where it can be decoded. Of course, the communication unit undergoing re-keying can provide appropriate handshake signals to the re-keying unit in the same digital signaling format, if necessary, by asserting a digital signaling enable over interface line 110 to enable the switch (107) to pass digital signals originating at the microcomputer (103) to the modulator input connection (120). Digital signals from the microcomputer are coupled to the switch (107) via an appropriate interconnecting data path (111).

Digital signals received on the digital signaling in path (109) cause the microcomputer (101) to start the re-keying process at the communication unit. The microcomputer (101) retrieves from RAM (103) the shadow key used to decrypt encrypted re-keying data. The shadow key is then transferred to the encryption algorithm (105) over the key path (115) to be loaded into the encryption algorithm's key register. The re-keying data received by the microcomputer (101) over the digital signaling in path (109) is then transferred to the encryption algorithm (105) over signal path 118, through a switch (122) and into the CTI input. The microcomputer (101) controls the operation of the switch (122) via a switch enable line (123). The decrypted data is passed back to the microcomputer (101) on the PTO path (116), and the new key is stored in RAM.

Since shadow keys are used in the ordinary course of operation to provide new keys to a communication unit, the unit will lose its ability to undergo this re-keying process if the shadow keys are lost, either inadvertently or as the result of tampering. This is where the key loss key store provided by the EEPROM section (104) of the microcomputer (101) comes into play.

The communication unit that has lost all of its shadow keys will request to be re-keyed using the key loss key. A re-keying unit, using the same process as the communication unit, will generate the key loss key. Using the resulting key loss key as a plain text shadow key, the re-keying unit encrypts a new shadow key(s) and/or new traffic keys and transmits them to the communication unit requesting to be re-keyed. The communication unit receiving the new keys stores the new keys in RAM after they are decrypted. In the preferred embodiment, when a new shadow key is loaded into RAM, a new key loss key is also generated and stored in EEPROM. Normal operation is restored after a new shadow key is received.

Figure 2:
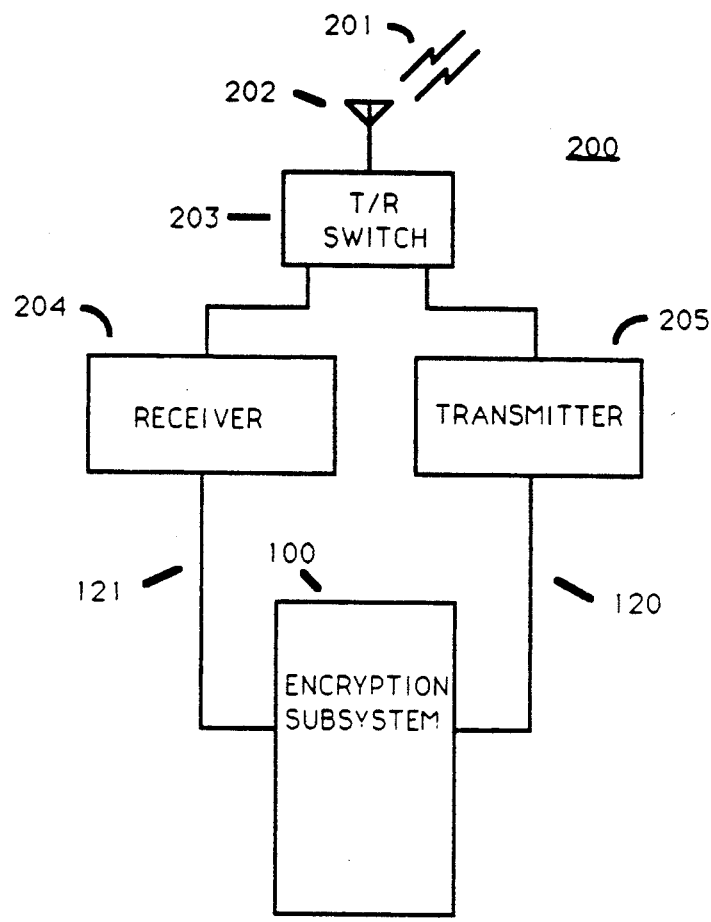
FIG. 2 represents, in block diagram form, a communication unit having the capability to recover from encryption key variable loss.

FIG. 2 is a block diagram representation of a communication unit (generally depicted by the number 200) incorporating the recovery method described herein. RF signals (201) are transmitted and received through an antenna (202) that is coupled to a transmit/receive (T/R) switch (203). The T/R switch (203) permits the antenna (202) to be coupled to either a transmitter section (204) or a receiver section (205) at any given time, but not both. Of course, as is well-known in the art, the T/R switch (203) could be replaced by a duplexer in the event that full-duplex operation were desired.

Information signals from the receiver section (204) are coupled from the receiver's discriminator output via an appropriate connecting path (121) to the input of an encryption subsystem (100) of the type depicted in FIG. 1. The output of the encryption subsystem (100) is coupled to the modulator input of the transmitter section (120) via another interconnecting data path (120).

What is claimed is:

1. A method for recovering from key variable loss, the method comprising the steps of:

(a) deriving a new key encryption key from a previously stored key and storing the result in nonvolatile memory as a key loss key;
   (b) decrypting a transmitted key using the new key encryption key; and
   (c) storing the decrypted key for use in decrypting additional keys and/or information signals.

2. The method in accordance with claim 1, wherein the step (a) of deriving a new key encryption key comprises encrypting the previously stored key with itself.

3. Apparatus for recovering from key variable loss, the apparatus comprising:

means for deriving a new key encryption key from a previously stored key and storing the result in nonvolatile memory as a key loss key;
   means for decrypting a transmitted key using the new key encryption key;
   means for storing the decrypted key for use in decrypting additional keys and/or information signals.

4. A communication unit for use in a secure RF communication system, the communication unit comprising:

transmitter means for transmitting RF signals;
   receiver means for receiving RF signals;
   an encryption subsystem coupled to the transmitter means and the receiver means, wherein the encryption subsystem comprises:
   means for deriving a new key encryption key from a previously stored key and storing the result in nonvolatile memory as a key loss key;
   means for decrypting a transmitted key using the new key encryption key;
   means for storing the decrypted key for use in decrypting additional keys and/or information signals.

* * * * *